United States Patent Office 2,979,078
Patented Apr. 11, 1961

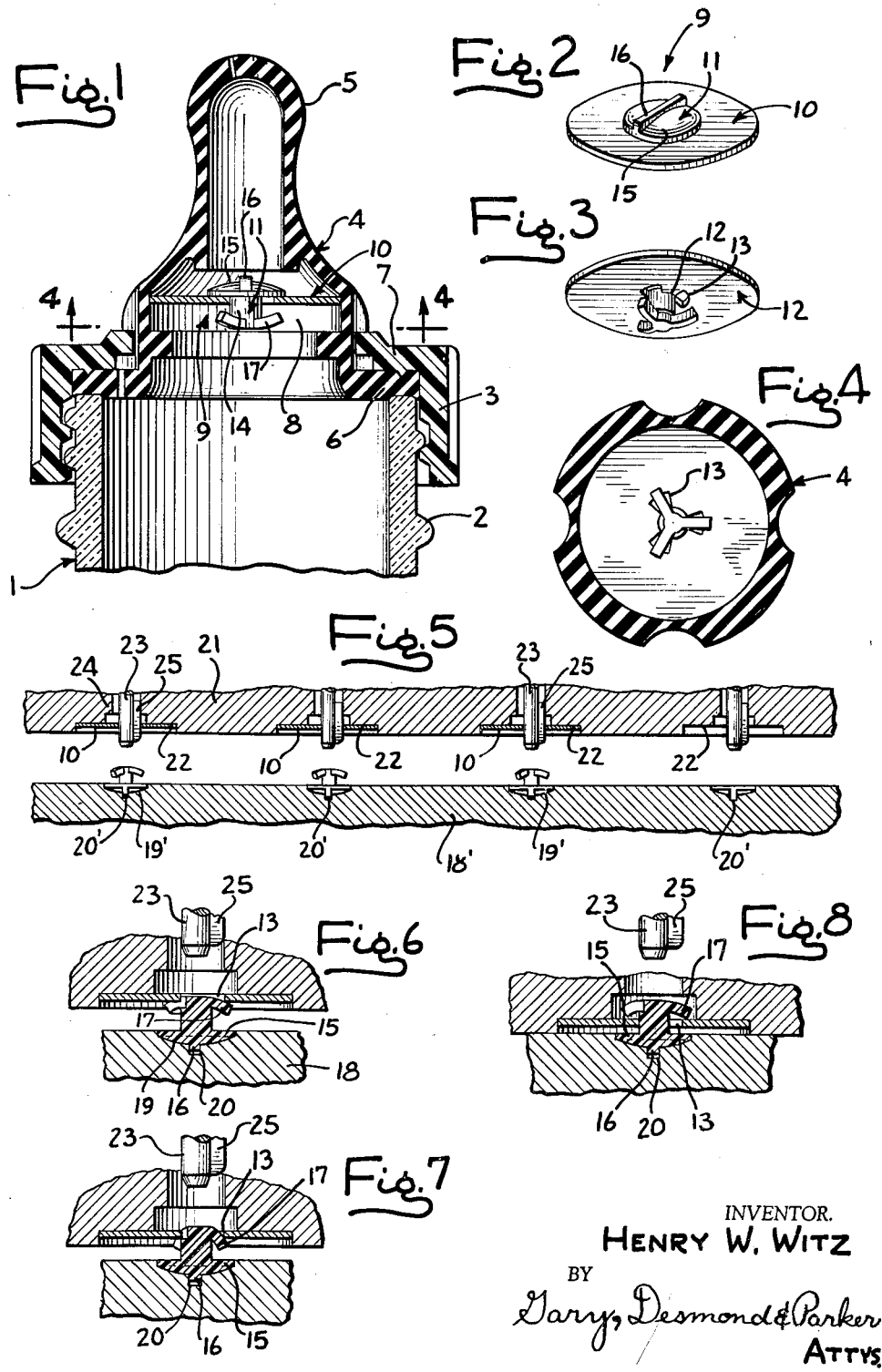

2,979,078
VALVE FOR NURSING BOTTLE NIPPLES
Henry W. Witz, Barrington, Ill., assignor to Nursmatic Corporation, Crystal Lake, Ill., a corporation of Delaware Filed Feb. 2, 1959, Ser. No. 790,504
1 Claim. (Cl. 137—533.29)

This invention relates to improvements in a valve for a nursing bottle nipple and refers particularly to a valve of the type described which is effective in operation and a simple method of assembling the component parts of the valve.

Valves for nursing bottle nipples have been heretofore proposed which comprises a metal disc for positioning within a nipple, the disc being provided with a central substantially clover-leaf opening through which a metal rivet is loosely positioned, one end of the rivet terminating in a relatively flat head which may be disposed in plane-parallel relationship to the disc to completely close the clover-leaf opening and the other end terminating in a relatively small head which prevents removal of the rivet from the opening but does not completely close to the clover-leaf opening. The rivet, when positioned in the opening is movable axially in the opening to permit the seating and unseating of the flat head of the rivet depending upon the pressure of the liquid baby food on each side of the disc.

The valve, hereinbefore described is relatively expensive, the parts usually comprising stainless steel, and it is difficult to manufacture and assemble in mass production. In addition, the rivet, the active portion of the valve, being constructed of metal is sluggishly responsive to differences in pressure to open and close the valve.

The valve comprising the present invention comprises a disc, similar to the discs of valves heretofore proposed but the active valve member which has heretofore comprised the metal rivet, hereinbefore described, is replaced by a plastic member of such characteristics as to provide a better operating valve, that is, a valve more responsive to differences in pressure on each side of the disc.

In addition, the characteristics of the active valve member both as to material and as to form or shape facilitate assembly of the valve member with the disc and thus a saving is effected, not only in the cost of materials but in the cost of production.

The objects, advantages and features of the present invention will be more apparent from the accompanying drawing and following detailed description.

In the drawing,

Fig. 1 is a detailed sectional view of a nursing bottle nipple showing the valve, embodying the concepts of the present invention, in operative position.

Fig. 2 is a perspective view of the top of the valve comprising the present invention.

Fig. 3 is a perspective view of the bottom of the valve shown in Fig. 1.

Fig. 4 is a sectional view taken on line 4—4 of Fig. 1 showing the valve in bottom plan.

Fig. 5 is a diagrammatic sectional view of a machine for assembling the valve components.

Figs. 6, 7 and 8 are detailed views showing sequential steps in assembling the components of the valve.

Referring in detail to the drawing, 1 indicates a conventional nursing bottle, the neck of which carries screw threads 2 with which the screw threads of a nipple retaining cap 3 may engage to secure a nipple 4 upon the bottle. The nipple 4 is of conventional construction having an apertured bulbous head 5 and a flange 6 which is secured upon the mouth of the bottle by an overhanging portion 7 of the cap 3. The interior of the nipple is provided with a valve compartment 8 in which the improved valve 9 is positioned.

The valve 9 comprises two components, a disc 10 and a valve member 11, sometimes referred to herein as the "active member" of the valve. The disc 10 is preferably constructed of metal, such as, stainless steel which resists corrosion in the presence of the usual baby food, but said disc may also be constructed of a plastic material preferably of a relative rigid type. Of course, if a plastic material is employed as the disc it must be non-toxic in the presence of liquid baby food. The disc is provided with a central circular opening 12, connected with which are a plurality, preferably three clover-leaf recesses 13 which radiate from the central opening 12.

The active member 11 comprises a shank 14 of a diameter less than that of the central opening 12 whereby the shank may fit loosely within said opening. One end of the shank 14 carries a head 15 which is flat on its inner side, that is, the side to which the shank connects, and is arcuate or dome-shaped on its opposite side. An orienting rib 16 extends above the dome-shaped side of the member 15 and is diametrically disposed across said member.

The opposite end of the shank 14 carries a plurality of radiating arms 17, preferably three arms. The arms are of a radial length somewhat longer than the radial extent of the clover-leaf recesses 13, and are of a width such as to pass through the narrowest dimension of each recess 13. Arms 17 curve upwardly at their ends towards disc 10 (see Fig. 1) to facilitate insertion of the active member 11 into the opening in disc 10 as well as to resist accidental dislodgment.

The active valve member 11 is constructed of a plastic material, such as polyethylene resin, the characteristics of the plastic material, in addition to being non-toxic in the presence of baby food, are such that the arms 17 are relatively resilient, being bendable to a degree and being capable of springing back to substantially their original position. Orienting rib 16 facilitates the alignment of arms 17 with recesses 13 when removing the active member for cleaning or replacement and when reinserting the same. The active member is preferably constructed integrally, but if desired the head 15, the shank 14 and the arms, collectively, may be constructed separately and subsequently cemented together to form the active valve unit. In all cases, however, the arms 17 will be resilient and capable of being bent by the exertion of a force thereon greater than a force met with in the operative use of the device.

In the use of a nursing bottle, the bottle is frequently inverted when the infant is fed, that is, the apertured bulbous portion of the nipple extends downwardly. In the act of extracting the baby food by the infant while feeding, the infant's lips embrace the bulbous portion of the nipple. Of course, with the nipple inverted, the flat portion of the head falls away from the clover-leaf opening and, hence, liquid enters the nipple through the clover-leaf recesses, as can be seen best in Fig. 4. Hence, with the nipple full of baby food, the infant's lips squeeze the nipple and pressurize the liquid in the nipple. The pressure thus established is intended to seat the head 15 upon the disc closing the clover-leaf recesses. Hence, the liquid is ejected through the nipple openings into the infant's mouth.

It must be understood that with the nipple inverted, the active member falls by gravity moving the head 15 away from the disc, and when pressure is established within the nipple, the active member must be moved, against gravity, to closed position. Hence, the weight of the active member is of importance. In nipple valves heretofore proposed, the active members were constructed of metal and, hence, were relatively heavy and, as has frequently happened, the infant has been unable to establish quickly sufficient pressure in the nipple to seat the head 15 quickly enough and a good share of the liquid is ejected back through the clover-leaf opening to the bottle before an appreciable amount thereof is ejected through the nipple openings. Thus the infant is frustrated in receiving an inadequate cyclic supply of food.

As a feature of the present invention, the active member is constructed of plastic material of lesser specific gravity than metal, and, hence, the pressure within the nipple exercises a greater effect on seating the relatively light active member than in the case where the active member comprises metal. Hence, the active valve member 11 seats more quickly responsive to the desires of the infant than does metal active valve members heretofore proposed.

As another feature of the invention, the plastic active member 11 can be assembled with the disc 10 in a most expeditious manner. With the active member inverted, that is, with the dome-shaped head extending downwardly and held to prevent rotation of the shank, the disc 10 may be brought to superposed position with the axes of the clover-leaf recesses in alignment with the respective arms 17, the disc may be moved downwardly toward the member 11, as shown best in Fig. 6. The edge defining the end of each clover-leaf recess thus bears upon the end of each arm and the arms are flexed downwardly, as shown best in Fig. 7. With continued downward movement of the disc, the radial lengths of the arms 17 are foreshortened until the arms snap through the clover-leaf openings, as shown best in Fig. 8. The arms, being resilient, return to substantially their original position and thereafter the active unit 11 is unremovably associated with the disc 10.

To facilitate the assembly operation a supporting base, shown diagrammatically at 18 in Figs. 6, 7 and 8 may be employed to support the active member 11 in inverted position. An inverted dome-shaped recess 19 may be provided in the base having a radius of curvature conforming with the dome-shaped head 15 and a diametral recess may be provided across the dome-shaped recess 19 to receive the rib 16. Thus, the base may function to hold the active member 11 in relatively immovable position during the assembly operation.

A machine for carrying out this operation whereby a plurality of valves may be simultaneously assembled may be easily devised. For example, such a machine is shown diagrammatically in Fig. 5, wherein a base 18' is provided with a plurality of inverted dome-shaped recesses 19', each of which is provided with a diametral slot 20'. A movable head 21 may be provided with a plurality of shallow recesses 22 suitable for the reception of discs 10. The discs may be held by friction in the recesses 22; they may be held by vacuum or if the discs are a ferromagnetic material the head 21 may be suitably magnetized to temporarily hold the discs. To align the clover-leafs with the arms 17, a spring-pressed guide pin 23 may be positioned through apertures 24 in the head 21 and each guide pin may carry a key 25 which may extend into a clover-leaf recess. When the head 21 descends, the discs may be slid downwardly along the guide pins and delivered into assembled relationship with the active members 11 carried by the base 18'.

Of course, many types of machines may be devised for carrying out the assembling operation and, hence, the present invention is not to be limited to the exact details of the diagrammatically shown machine.

I claim as my invention:

A valve construction for a nursing bottle comprising in combination, a flat stainless steel disc dimensioned to fit transversely across the valve compartment of a conventional nursing bottle nipple and having a central circular opening with which are connected three radially positioned clover-leaf openings, a valve member comprised of a shank of lesser diameter than said central circular opening and fitting loosely therein and of a length substantially in excess of the thickness of said disc for movement in a direction perpendicular to the plane of said disc, a head on one end of said shank having a diameter greater than the maximum radial extent of said clover-leaf openings and having a flat surface on the side adjacent said disc and being dome-shaped on the opposite side, a diametrically disposed orienting rib having a substantially flat upper surface extending completely across said dome-shaped side, three radiating arms on the other end of said shank curving at their extremities towards the disc, each being of a length greater than the radial extent of said clover-leaf openings and of a width to pass through the narrowest dimension of said clover-leaf openings, said arms being comprised of polyethylene resin characterized by non-toxicity and a degree of resilience sufficient to permit their being bent to fit longitudinally within said clover-leaf openings and then capable of springing back to their original form, said shank and head also being comprised of polyethylene resin and integral with said arms.

References Cited in the file of this patent

UNITED STATES PATENTS

| 873,627 | Staunton | Dec. 10, 1907 |
| 2,597,483 | Head | May 20, 1952 |
| 2,745,568 | Newton | May 15, 1956 |

FOREIGN PATENTS

| 534,811 | Canada | Dec. 25, 1956 |
| 507,085 | Great Britain | June 9, 1959 |